United States Patent [19]

Brand et al.

[11] Patent Number: 4,916,107

[45] Date of Patent: Apr. 10, 1990

[54] CATALYST FOR THE SELECTIVE REDUCTION OF NITROGEN OXIDES WITH AMMONIA

[75] Inventors: Reinhold Brand; H. Bernd Engler, both of Hanau; Wolfgang Honnen, Bruchkoebel; Peter Kleine-Moellhoff; Edgar Koberstein, both of Alzenau, all of Fed. Rep. of Germany

[73] Assignee: Degussa Aktiengesellschaft, Frankfurt, Fed. Rep. of Germany

[21] Appl. No.: 272,311

[22] Filed: Nov. 17, 1988

[30] Foreign Application Priority Data

Nov. 27, 1987 [DE] Fed. Rep. of Germany ....... 3740289

[51] Int. Cl.$^4$ .................. B01J 21/06; B01J 23/20; B01J 23/22; B01J 23/28
[52] U.S. Cl. .................. 502/309; 423/239 A
[58] Field of Search .................. 502/309; 423/239 A

[56] References Cited

U.S. PATENT DOCUMENTS 4,085,193 4/1978 Nakajima et al. .............. 502/309 X
4,466,947 8/1984 Imanari et al. .................. 502/309 X Primary Examiner—W. J. Shine
Attorney, Agent, or Firm—Beveridge, DeGrandi & Weilacher

[57] ABSTRACT

A catalyst for the selective reduction with ammonia of nitrogen oxides from an intimate mixture of at least 3 metals in the form of their oxides, namely, titanium, tungsten and at least one of the metals vanadium, iron, niobium, molybdenum, with an atomic ratio of Ti to the other metals of 1:0.001 to 1, wherein there is used as oxide of the titanium a product obtained by flame hydrolysis, which product is impregnated with solutions of the salts of the other metals and is dried and calcined at a high temperature.

14 Claims, 2 Drawing Sheets

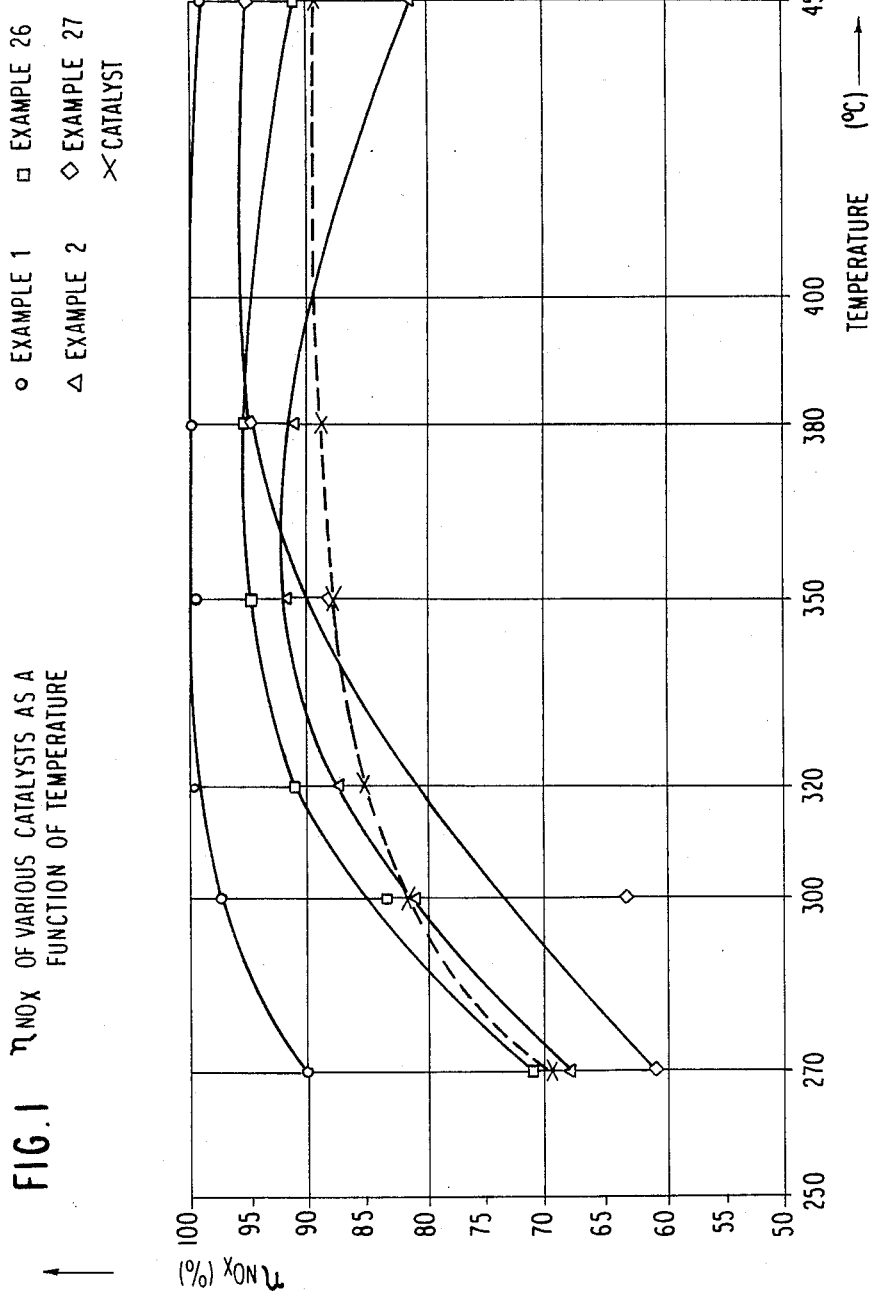

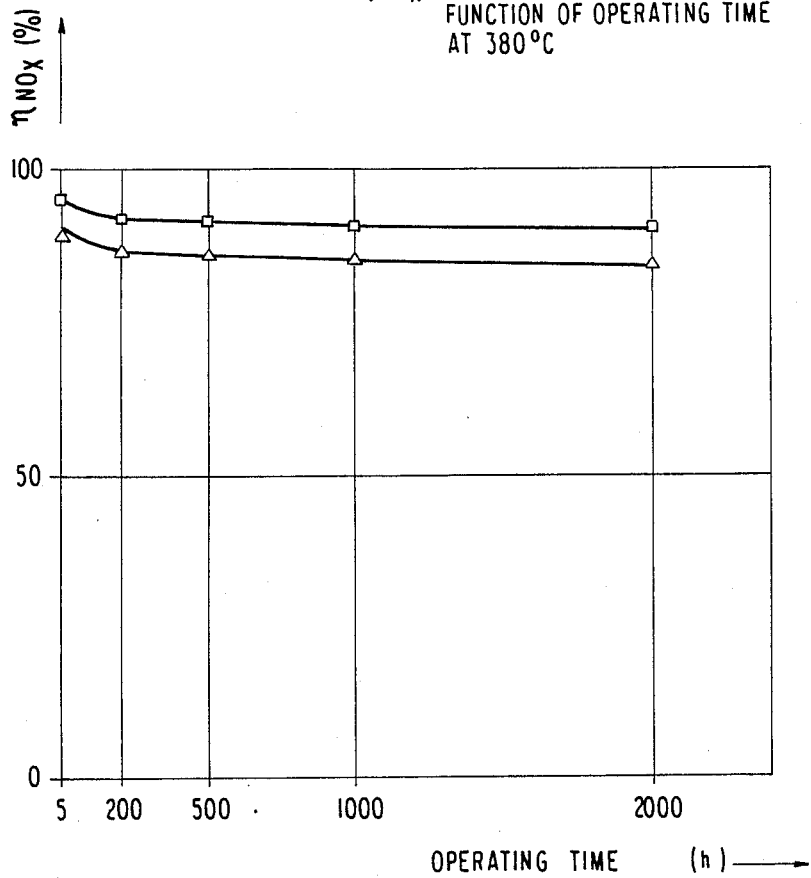
FIG.2 η NOx OF VARIOUS CATALYSTS AS A FUNCTION OF OPERATING TIME AT 380°C
□ EXAMPLE 26
△ EXAMPLE 2

CATALYST FOR THE SELECTIVE REDUCTION OF NITROGEN OXIDES WITH AMMONIA

INTRODUCTION AND BACKGROUND

The present invention relates to a catalyst, which is improved in terms of ease of preparation, activity and lifetime, for the selective reduction with ammonia of nitrogen oxides contained in oxygen-containing exhaust gases, e.g. stackgases from power plants, based on an intimate mixture of the active constituents (A) titanium and
(B) tungsten as well as vanadium, iron, niobium and/or molybdenum each in the form of oxides of the said metals, with an atomic ratio of constituent (A) to (B) of 1 : 0.001 to 1, preferably 1 : 0.003 to 0.3.

Catalysts with these basic materials and similar atomic ratios constitute the subject of German Patent No. 2,458,888. With these known catalysts it is essential that the constituents (A) and (B) be obtained as an intimate mixture in the form of their oxides. According to this prior patent, this object is achieved by using titanium oxide in the form of one of its chemical precursors, such as titanium hydroxide, a titanium salt or titanic acid. This precursor is then combined with soluble or precipitated compounds of the metals of the constituent (B), and is then further processed by pyrolysis to produce the desired oxide material.

It has now been found that equivalent or superior catalyst formulations of the basically known type are more easily accessible if the constituent (A) is used in the form of an oxide obtained from titanium tetrachloride by using flame hydrolysis.

SUMMARY OF THE INVENTION

Accordingly, an object of the invention is to provide a catalyst for the selective reduction with ammonia of nitrogen oxides from an intimate mixture of at least three metals in the form of their oxides, namely (A) titanium as constituent (A),
($B_1$) tungsten as the first constituent B, and
($B_2$) at least one of the metals vanadium, iron, niobium, and/or molybdenum as the second constituent (B), with an atomic ratio of the metals of constituent (A) to (B) of 1 : 0.001 to 1, preferably 1 : 0.003 to 0.3.

The catalyst is characterized by the fact that the constituent (A) is present in the form of a finely divided oxide obtained by flame hydrolysis of titanium tetrachloride, which finely divided oxide has the following properties:

| | | |
|---|---|---|
| BET surface area | $m^2/g$ | 50 ± 15 |
| average size of primary particle | nm | 30 |
| tamp density[1] | g/L | ca. 150 |
| loss on drying[2] (2 h at 105° C.) | wt. % | 1.5 |
| loss on ignition[2][4] (2 h at 1000° C.) | wt. % | 2 |
| pH[3] (in 4% aqueous dispersion) | | 3–4 |
| x-ray structure | | mainly anatase |
| isoelectric point at pH value | | 6.6 |
| density | $g/cm^3$ | 3.8 |
| $Al_2O_3$[5] | wt. % | 0.3 |
| $TiO_2$[5] | wt. % | 99.5 |
| $SiO_2$[5] | wt. % | 0.2 |
| $Fe_2O_3$[5] | wt. % | 0.01 |
| HCl[5][6] | wt. % | 0.3 |

[1]according to DIN 53194 or ISO 787/XI
[2]according to DIN 55921 or ISO 787/II, or ASTM D280-33 (loss on drying) and ASTM D1208-65 (loss on ignition)
[3]according to DIN 53200 or ISO 787/IX, or ASTM D 1208-65
[4]based on the substance dried 2 h at 105° C.
[5]based on the substance calcined 2 h at 1000° C.
[6]HCl content is a part of the loss on ignition The catalyst is obtained by impregnation of the said titanium dioxide with solutions of salts of the metals of group (B), drying and calcination at 100–650, preferably 300–600° C.

Titanium dioxide with the above characteristics is known in the art and is readily available. A particularly suitable titanium dioxide is the highly dispersed product manufactured and sold by Degussa A under the designation Titanium Dioxide P 25. It has a large specific surface area and a very narrow particle size distribution, with an average size of the primary particles being 30 nm, and exists mainly in the form of anatase and to a lesser proportion in the form of rutile, thus having fractions in both crystal modifications.

The catalyst in accordance with the invention can be made in the form of a catalyst on a carrier or a shaped catalyst.

According to the first-mentioned form of application, it is applied as a coating to an essentially inert, structurally reinforcing carrier made of ceramic or metal.

Suitable carrier materials are ceramic bodies made e.g. of alpha-aluminum oxide, mullite, cordierite, zirconium mullite, barium titanate, porcelain, thorium oxide, steatite, boron carbide, silicon carbide, silicon nitride, or metallic bodies made form stainless steel or so-called heat-conducting alloys (Cr/Fe/Al alloys).

The carrier catalysts can be obtained according to various advantageous methods. For example, the titanium dioxide can be first precipitated from an aqueous suspension on the structurally reinforcing carrier by the so-called washcoat process, then dried and annealed at 300–600° C. After this it can be impregnated with the combined salt solutions of the metals of the constituent (B), dried and calcined.

In another variation, the impregnation with the salt solutions of the metals of the constituent (B) can be successively carried out with the salt solutions of the metals of the constituent (B) while metadrying and metaannealing as required. In particular, the titanium dioxide which has been precipitated on the carrier and annealed can be first impregnated with tungstic salt, then with vanadium salt, iron salt, niobium salt, molybdenum salt, or a combination of these last-mentioned salts.

According to another embodiment of the invention, the titanium dioxide is treated in an aqueous suspension with the salt solutions of the metals of the constituent (B) and the mixture is then spray-dried and calcined as required. In this embodiment the catalyst slurry obtained in spray-dried and optionally recalcined form is kneaded with a wetting agent, support material, binder, shaping aid and pore former as required to form a homogeneous paste. The paste can then be molded into any desired shape or extruded. The resulting shapes are then dried and calcined.

The coating of inert structural reinforcers with titanium dioxide can be effected by the well known so-called wash-coat process. For this purpose, aqueous suspensions with a solids content between 5 and 60 weight % can be used.

Illustratively, solutions of the following compounds can be used for the individual metals: ammonium para- of meta tungstate, tungsten halides, tungstic acid, ammonium meta vanadate, vanadyl oxalate, vanadyl halides, iron chloride, iron sulfate, iron nitrate, iron hydroxide, organic iron salts, niobium oxide hydrate, niobium oxalate, as well as ammonium molybdate and molybdenum halides. All drying procedures used as part of the preparation of carrier catalysts fall within the temperature range of 20–400° C.

If an aqueous suspension of titanium dioxide treated with the salt solutions of the metals of constituent (B) is to be spray dried, this can be carried out in the usual spray drying apparatus. Drying temperatures customarily employed are 150–550° C.

When preparing shaped catalysts, a number of additives are also necessary in addition to the spray-dried catalyst slurry. Thus water, ethanol, ammonium chloride solution and ethanolamine can be used as moistening agents. Glass fibers, for example, may be used as support materials.

Suitable binders, which serve to impart adequate stability to the pastes which are being made, after shaping into desired shaped bodies while in the so-called green body condition, are e.g. cellulose derivatives. In order to facilitate compression molding or extrusion, shaping aids are added, e.g. bentonites, clay minerals or organic acids.

Finally, the porosity of the shaped catalyst can also be controlled by the addition of suitable pore formers, which decompose during the intended calcination or annealing processes, with the evolution of gas. Such substances are e.g. finely divided carbon-particles or mechanical wood pulp.

In addition, the following may be used as fillers: silica gel (including precipitated and pyrogenically prepared silica gel), aluminum oxide, aluminosilicates or porcelains, in an amount of up to 50 weight %, based on the total weight of all constituents of the finished catalyst.

For kneading the starting materials into homogeneous paste, kneading machines, e.g. a paddle kneader, are used.

The catalysts in accordance with the invention are distinguished from state of the art catalysts by high activity, selectivity and long-term strength, which are evidence that the criterion set forth in German Patent No. 2,458,888 is essential for achieving an intimate mixture among the catalyst constituents, even with a procedure in accordance with the invention, has been fulfilled. The form of application of the new catalysts as deposits on carriers or as shaped catalysts provides for a broader range of applications than was possible with the hitherto known systems. In particular, the catalysts can be prepared as exceptionally effective and very finely divided carrier catalysts in monolithic form.

BRIEF DESCRIPTION OF THE DRAWINGS

The invention will now be further elucidated in conjunction with the drawings wherein:

FIG. 1 shows the dependence of the $NO_x$ conversion $[\eta]NO_x$ of various catalysts in accordance with the invention as a function of temperature, and FIG. 2 shows the dependence of the $NO_x$ conversion $[\eta]NO_x$ of various catalysts in accordance with the invention as a function of the operating time at 380° C.

DETAILED DESCRIPTION OF THE INVENTION

The following examples are illustrative of the detailed aspects of the invention.

EXAMPLE 1

Ten kg of the titanium dioxide having the characteristic mentioned above is stirred into 35 l of deionized water. The suspension thus obtained is treated, with continuous stirring, with 250 ml of nitric acid having a density 1.39 g/cm$^3$.

The coating of the honeycomb body having channels of square cross section with a cell size (1 web +1 opening) of about 2.0 mm is effected by immersing the ceramic carrier into the aqueous suspension of titanium oxide.

Following the immersion step, the channels of the monolithic carrier are blown open with compressed air and then dried at 150° C. in a current of air.

This procedure is repeated (2–4 times) until about 160 g of titanium oxide per cubic decimeter of carrier volume has been applied. The coated and dried honeycomb bodies are annealed at 550° C. for two hours.

A quantity of solution of ammonium meta tungstate (corresponding to 5 g $WO_3$ per 100 g titanium dioxide) and vanadium oxalate (corresponding to 5 g $V_2O_5$ per 100 g titanium dioxide) in water which is appropriate for the water-uptake capacity of the coated carrier is applied by impregnation.

The catalyst is dried by passing a current of fresh air through the honeycomb body at 150° C. It is then annealed at 550° C. for two hours.

EXAMPLES 2–14

The catalysts listed in Table 1 are prepared in a manner corresponding to the process described in Example 1.

Niobium oxide is used as niobium oxalate, iron as iron(III) nitrate, and molybdenum as ammonium molybdate in aqueous solution.

TABLE 1

| Example | $V_2O_5$* | $Fe_2O_3$* | $Nb_2O_5$* | $MoO_3$* | $WO_3$* |
| --- | --- | --- | --- | --- | --- |
| 2 | 1.0 | — | — | — | 9.0 |
| 3 | 2.5 | — | — | — | 2.5 |
| 4 | 0.5 | — | — | — | 9.5 |
| 5 | 5 | — | — | — | — |
| 6 | 5 | 5 | — | — | — |
| 7 | 5 | 2 | — | — | 5 |
| 8 | 5 | — | 5 | — | — |
| 9 | 5 | — | 2 | — | 5 |
| 10 | 5 | — | — | 2 | 5 |
| 11 | — | 5 | — | — | — |
| 12 | — | 5 | — | 6.6 | 5 |
| 13 | — | — | — | 5 | 5 |
| 14 | — | — | 5 | 5 | — |

*All data are in grams of metal oxide per 100 g titanium dioxide

EXAMPLE 15

The coating of the carrier with titanium dioxide is carried out as described in Example 1.

Five g iron oxide per 100 g titanium dioxide is applied by impregnating the coated carrier with a solution of iron nitrate in a quantity of water which is appropriate to the water-uptake capacity of the honeycomb body. Drying is effected at 150° C. while passing a current of air through the material.

It is then annealed for 30 min at 450° C. After cooling of the sample, 5 g molybdenum oxide per 100 g titanium dioxide is applied by impregnation with an aqueous solution of ammonium heptamolybdate corresponding to the process described above for the application of iron.

Drying is effected at 150° C. while passing a current of air through the material. The final annealing is carried out at 550° C. for 2.5 hours.

Examples

EXAMPLE 16-18

The catalysts listed in table 2 are prepared corresponding to the process described in Example 15.

Tungsten oxide is applied to the $TiO_2$-coated, annealed carrier as the first constituent, and vanadium oxide as the second constituent. For impregnation with tungsten, the quantity of tungstic acid corresponding to the concentration in accordance with Table 2 is dissolved in boiling ammonia solution. The impregnation is carried out as described in Example 15. The intermediate drying is performed for one hour at 250° C. while passing a current of air through the material. The cooled sample is impregnated with an aqueous solution of vanadium oxalate corresponding to Example 15. The final drying is carried out at 600° C. for 1.5 hours.

TABLE 2

| Example | $V_2O_5$* | $WO_3$* |
|---|---|---|
| 16 | 1.25 | 1.25 |
| 17 | 2.5 | 2.5 |
| 18 | 5 | 5 |

*all data are in grams of metal oxide per 100 g titanium dioxide

Example 19-21

The titanium dioxide mentioned in claim 1 is suspended in an aqueous solution of ammonium para tungstate. In each case the atomic ratio of titanium to tungsten is chosen such that the weight ratio of $TiO_2:WO_3$ is 9 : 1.

The solids concentration of the above-mentioned suspension is adjusted to 20 weight %. The pH is adjusted to between 8 and 10 by the addition of aqueous ammonia solution. The suspension is then stirred for 2 hours at 60° C.

In order to form a finely divided and homogeneous suspension of titanium and tungsten oxides, spray drying is carried out with gas heated to 550° C. in a countercurrent procedure. Thereupon, the spray dried powder is calcined for one hour at 650° C.

In a manner corresponding to the process described in Example 1, a honeycomb body having a carrier volume of 176 g/cm³ is coated with the $TiO_2/WO_3$ mixture.

Next follows an impregnation with combined (Example 19) or separated (Examples 20, 21) salt solutions of the metals of the constituent $B_2$ by the methods described in Examples 1–14 and 15–16.

TABLE 3

| Example | Wt. ratio $TiO_2/WO_3$ | Constit. $B_2$ | Prop. of $B_2$ oxide in g/100 g mixed oxide |
|---|---|---|---|
| 19 | 9:1 | $V_2O_5$ | 1.0 |

TABLE 3-continued

| Example | Wt. ratio $TiO_2/WO_3$ | Constit. $B_2$ | Prop. of $B_2$ oxide in g/100 g mixed oxide |
|---|---|---|---|
| 20 | 9:1 | $Nb_2O_5$ | 1.0 |
| 21 | 9:1 | $MoO_3$ | 1.0 |

EXAMPLES 22-25

In a manner corresponding to the process described in Examples 19-21, a titanium-tungsten mixture is prepared having a weight ratio of titanium dioxide to tungsten oxide of 9 : 1.

Ten kg of this mixed oxide is treated with a solution of ammonium metavandate corresponding to 100 g $V_2O_5$, and is treated with 500 ml of a 2 wt. % aqueous ammonia solution and 100 g monoethanolamine. Then, under intensive kneading, there are added successively 60 g of mechanical wood pulp, 500 g of largely alkali-free clay, and 300 g of glass fibers (1-4 cm long). The mixture is kneaded for 5 hours to give a homogeneous paste. Additional aqueous ammonia is metered in to adjust the plasticity to be suitable for shaping. The catalyst slurry is then molded into honeycomb bodies with channels of square cross section (cell dimension 3.3 mm).

After drying at temperatures increasing from 20 to 60° C. in a controlled-temperature drying chamber, the shaped bodies are calcined for 24 hours at temperatures increasing from 300 to 600° C.

In Examples 23-25, instead of ammonium metavanadate, niobium oxalate or ammonium molybdate, dissolved in water, is added in the ratios indicated in Table 4.

TABLE 4

| Example | Wt. ratio $TiO_2/WO_3$ | Constit. $B_2$ | Prop. of $B_2$ oxide in g/100 g mixed oxide |
|---|---|---|---|
| 22 | 9:1 | $V_2O_5$ | 1.0 |
| 23 | 9:1 | $Nb_2O_5$ | 1.0 |
| 24 | 9:1 | $MoO_3$ | 1.0 |
| 25 | 9:1 | $V_2O_5/MoO_3$ | 0.5/0.5 |

Examples 26-34

The titanium dioxide mentioned in the summary of the invention is treated in a kneading machine successively with an aqueous solution of ammonium paratungstate and a salt solution from the group of $B_2$ metals. As the latter salt solution is used an ammonium metavandate or ammonium molybdate solution as described in Examples 22-25, and also an aqueous solution of niobium oxalate or an aqueous suspension of iron hydroxide. The concentration of the oxides of the above-stated metals can be found in Table 5. The kneaded mixture so obtained is made into an extrudable paste by a process similar to that described in Examples 22-25. This paste is molded into honeycomb bodies and the shaped bodies, after drying at temperatures increasing from 20 to 60° C. in a controlled-climate climate drying chamber, are calcined for 24 hours at temperature increasing from 400 to 600° C.

TABLE 5

| Example | Wt. ratio TiO$_2$/WO$_3$ | Constit. B$_2$ | Prop. of B$_2$ oxide in g/100 g TiO$_2$/WO$_3$ |
|---|---|---|---|
| 26 | 9:1 | V$_2$O$_5$ | 1.0 |
| 27 | 9:1 | Nb$_2$O$_5$ | 1.0 |
| 28 | 9:1 | MoO$_3$ | 1.0 |
| 29 | 9:1 | V$_2$O$_5$/Mo O$_3$ | 0.5/0.5 |
| 30 | 9:1 | Fe$_2$O$_3$ | 1.0 |
| 31 | 9.9:0.1 | V$_2$O$_5$ | 1.0 |
| 32 | 9.5:0.5 | V$_2$O$_5$ | 1.0 |
| 33 | 8:2 | V$_2$O$_5$ | 1.0 |
| 34 | 7:3 | V$_2$O$_5$ | 1.0 |

RESULTS

The catalysts prepared according to Examples 1, 2, 26, and 27 were tested in the stack gas of an oil fired boiler, which was adjusted by metering in additional harmful gases (NO$_x$ and SO$_2$) and the ammonia required for nitrogen oxide reduction in accordance with the test conditions indicated below.

| Test Conditions | |
|---|---|
| Composition of stack gas: | |
| NO$_x$ | 800 Vppm |
| NH$_3$ | 800 Vppm |
| SO$_2$ | 500 Vppm |
| O$_2$ | 5 V % |
| H$_2$O | 11 V % |
| CO$_2$ | 12 V % |
| N$_2$ | balance |

The individual measurement results, obtained in the temperature range 200–500° C. and at a space velocity of 20,000 h$^{-1}$, are shown in the graphs in FIGS. 1 and 2, where the values used in the graphs are derived from the following Tables:

TABLE for FIG. 1

| T/°C. | Exple 1 | Exple 2 | Exple 26 | Exple 27 |
|---|---|---|---|---|
| 270 | 90 | 67.5 | 70.7 | 61.0 |
| 300 | 97.5 | 81.0 | 83.2 | 63.5 |
| 320 | 99.5 | 87.5 | 91.0 | — |
| 350 | 99.2 | 91.5 | 94.7 | 88.0 |
| 380 | 99.9 | 90.7 | 95.0 | 94.8 |
| 450 | 99.0 | 81.3 | 91.0 | 95.2 |

TABLE for FIG. 2:

| Operating time (h) | Example 2 | Example 26 |
|---|---|---|
| 5 | 90.7 | 95.0 |
| 200 | 86.6 | 91.8 |
| 500 | 86.0 | 91.0 |
| 1000 | 85.00 | 90.2 |
| 2000 | 84.00 | 90.0 |

COMPARATIVE EXAMPLE

A catalyst made for purposes of comparison by following the directions of German Patent No. 2,458,888, Example X-1, No. 5, with a weight ration of TiO$_2$/WO$_3$ of 9 : 1 and a proportion of V$_2$O$_5$ per 100 g TiO$_2$/WO$_3$ of 1 g, which was prepared and tested as in Example 26 in the form of an extruded honeycomb body, showed the following results, which are inferior to those of Example 26, especially in the range of 300–380° C:

| T/°C. | NO$_x$(%) |
|---|---|
| 270 | 69.3 |
| 300 | 81.7 |
| 320 | 85.0 |
| 350 | 87.8 |
| 380 | 88.8 |
| 450 | 89.5 |

We claim:

1. A catalyst for the selective reduction with ammonia of nitrogen oxides in oxygen containing exhaust gas comprising an intimate mixture of at least three metals each in the form of their oxides, namely,
    (A) titanium as constituent A,
    (B$_1$) tungsten as the first constituent B, and
    (B$_2$) at least one of the metals selected from the group consisting of vanadium, iron, niobium, and molybdenum as the second constituent B with an atomic ratio of constituent (A) to (B) of 1 : 0.001 to 1, wherein the constituent (A) is present in the form of a finely divided oxide obtained by flame hydrolysis of TiCl$_4$ and wherein said finely divided oxide has the following properties:

| | | |
|---|---|---|
| BET surface area | m$^2$/g | 50 +/− 15 |
| average size of primary particles | nm | 30 |
| tamp density[1] | g/L | ca. 150 |
| loss on drying[2] (2 h at 105° C.) | wt. % | 1.5 |
| loss on ignition[2][4] (2 h at 1000° C.) | wt. % | 2 |
| pH[3] (in 4% aqueous dispersion) | | 3–4 |
| x-ray structure | | mainly anatase |
| isoelectric point at pH | | 6.6 |
| density | g/cm$^3$ | 3.8 |
| Al$_2$O$_3$[5] | wt. % | 0.3 |
| TiO$_2$[5] | wt. % | 99.5 |
| SiO$_2$[5] | wt. % | 0.2 |
| Fe$_2$O$_3$[5] | wt. % | 0.01 |
| HCL[5][6] | wt. % | 0.3 |

[1] according to DIN 53194 or ISO 787/XI
[2] according to DIN 55921 or ISO 787/II, or ASTM D 280-30 (loss on drying) and ASTM D1208-65 (loss on ignition)
[3] according to DIN 53200 or ISO 787/IX, or ASTM D 1208-65
[4] based on the substance dried 2 hours at 105° C.
[5] based on the substance calcined 2 hours at 1000° C.
[6] HCl content is a part of the loss on ignition and the catalyst is obtained by impregnation of the said titanium dioxide with solutions of salts of the metals of group (B), drying and calcination at 100–650° C.

2. The catalyst as set forth in claim 1, wherein the atomic ratio is 1 : 0.003 to 0.3.

3. The catalyst as set forth in claim 1 where the calcination is at 300 to 600° C.

4. The catalyst as set forth in claim 1 in the form of a coating deposited on an essentially inert, structurally reinforcing carrier made of ceramic or metal.

5. The catalyst as set forth in claim 1 in the form of an extruded shaped body.

6. The catalyst as set forth in claim 1, wherein the titanium dioxide is first precipitated from an aqueous suspension onto a structurally reinforcing essentially inert carrier, then dried and annealed at 300–600° C., after which the titanium dioxide is impregnated with combined salt solutions of the metals of the constituent (B), dried and calcined.

7. The catalyst as set forth in claim 6, wherein the impregnation with the salt solutions of the metals of the constituent (B) is successively carried out with the salt solutions of the metals of the constituent (B) while drying and annealing.

8. The catalyst as set forth in claim 7, wherein the titanium dioxide which has been precipitated on the carrier and annealed is first impregnated with tungstic and salt, then with vanadium salt, iron salt, niobium salt,,molybdenum salt, or a combination of the last-mentioned salts.

9. The catalyst as set forth in claim 1, wherein the titanium dioxide is treated in an aqueous suspension with the salt solutions of the metals of the constituent (B) and the mixture is then spray-dried.

10. The catalyst as set forth in claim 1, wherein the titanium dioxide is impregnated with a plurality of solutions in a stepwise manner and the resulting mixture is subsequently calcined after each impregnation.

11. The catalyst as set forth in claim 9, wherein the catalyst slurry obtained in spray-dried form is kneaded with at least one of the groups consisting of a wetting agent, support material, binder, shaping aid and pore former, and mixture thereof, to form a homogeneous paste and the paste is shaped into a body and the resulting shaped body is then dried and calcined.

12. The catalyst as set forth in claim 7, wherein the constituent (A) in the form of titanium oxide and metals of the constituent (B) in the form of salts are kneaded into a homogeneous paste, the paste is shaped into a body, dried and calcined.

13. The catalyst as set forth in claim 11, wherein the paste is molded into a shaped body.

14. The catalyst as set forth in claim 11, wherein the paste is extruded into a shaped body.

* * * * *